United States Patent [19]
Tanaka et al.

[11] Patent Number: 5,798,744
[45] Date of Patent: Aug. 25, 1998

[54] LIQUID CRYSTAL DISPLAY APPARATUS

[75] Inventors: Takeshi Tanaka; Yoshiharu Nagae, both of Hitachi; Nobutake Konishi, Hitachioota, all of Japan

[73] Assignee: Hitachi, Ltd., Tokyo, Japan

[21] Appl. No.: 507,990

[22] Filed: Jul. 27, 1995

[30] Foreign Application Priority Data

Jul. 29, 1994 [JP] Japan .................. 6-177941

[51] Int. Cl.⁶ ............................... G09G 3/36
[52] U.S. Cl. ............................. 345/92; 345/206
[58] Field of Search ................... 345/92, 205, 206; 349/43, 187, 42

[56] References Cited

U.S. PATENT DOCUMENTS

| | | | |
|---|---|---|---|
| 4,582,395 | 4/1986 | Morozumi | 345/92 |
| 4,644,338 | 2/1987 | Aoki et al. | 345/92 |
| 4,646,074 | 2/1987 | Hashimoto | 345/206 |
| 5,247,375 | 9/1993 | Mochizuki et al. | 349/43 |
| 5,250,931 | 10/1993 | Misawa et al. | 345/206 |
| 5,589,406 | 12/1996 | Kato et al. | 437/21 |

FOREIGN PATENT DOCUMENTS 5-113574  5/1993  Japan .

OTHER PUBLICATIONS

"Densi Gijitsu (Electronics Technology)" pp. 6-8, Jun. 1993.

"International Electron Devices Meeting Technical Digest", pp. 389-392, 1993.

*Primary Examiner*—Jeffery Brier
*Attorney, Agent, or Firm*—Antonelli, Terry, Stout & Kraus, LLP

[57] ABSTRACT

A liquid crystal display apparatus has a pair of substrates, at least one of which is transparent, and a liquid crystal layer formed by enclosing a liquid crystal composition between the pair of the substrates, wherein a display region having a plurality of first semiconductor elements which are arranged in a matrix, and a peripheral circuits region having a plurality of second semiconductor elements for driving said plurality of first semiconductor elements, arranged at the periphery of the display region, are formed on the one substrate of said pair of substrates, and driver circuits for driving the peripheral circuits are bonded at a designated region on the one substrate of the pair of substrates.

22 Claims, 13 Drawing Sheets

LIQUID CRYSTAL DISPLAY APPARATUS

BACKGROUND OF THE INVENTION

The present invention relates to a liquid crystal display apparatus, especially, to an active matrix liquid crystal display apparatus using a thin film transistor.

An active matrix type liquid crystal display apparatus has thin film transistors (TFT) in the vicinity of the mutual crossing points of a plurality of scan lines and a plurality of signal lines, and liquid crystal pixels are driven by the TFT on a substrate. The scan lines and the signal lines are connected to external driver integrated circuits (IC), and are supplied with scanning signals and image signals, respectively. An image signal is applied to the liquid crystal by the TFT which is turned on by the scanning signal to display a designated image.

As for the methods for connecting the external driver to the line on the substrate, there are a TAB method, which uses an organic resin film having a metallic wiring pattern, and a COG (Chip On Glass) method, wherein the external driver is directly connected to the substrate by soldering or by using metallic paste. One example of a COG method is disclosed in JP-A-5-113574 (1993).

An example of methods wherein the number of external drivers is decreased by integrating all or a part of the functions of the external drivers onto the substrate is disclosed in "Densi Gijitsu (Electronics technology)" p. 6–8, Jun., (1993), and "International Electron Devices Meeting Technical Digest, p. 389–392 (1993).

However, in the above prior art, reduced cost, a decrease in power consumption, an improved display quality, and a decrease in the apparatus overall size are not fully considered.

SUMMARY OF THE INVENTION

An object of the present invention is to provide a high resolution active matrix liquid crystal display apparatus having a reduced overall size and a low manufacturing cost.

In accordance with the liquid crystal display apparatus relating to the present invention, a display region having a plurality of first semiconductor elements, which are arranged in the form of a matrix, and a peripheral circuit region, having a plurality of second semiconductor elements for driving the first semiconductor elements, are formed on a glass substrate.

Further, a driver circuit for driving the peripheral circuit is connected to the peripheral circuits at a designated region of the substrate.

Thin film transistors for the first and second semiconductor elements and a glass plate for the substrate are preferable.

In accordance with a preferred embodiment of the present invention, a peripheral circuit region is composed of a TFT having a faster operating speed than the TFT used for the display region on the glass substrate, and the number of drivers is limited to at most two.

A driver is connected directly to the substrate by a COG method. On account of the COG mounting, the vibration resistance and anti-shock properties are improved. Thinning of the casing-wall material of the liquid crystal display apparatus can be achieved. Thus, the overall size of the liquid crystal display apparatus can be decreased.

Because the number of drivers is limited to one or two, the length of the wiring on the glass substrate can be minimized. Usually, the wiring has a large sheet resistance because the wiring is made of the same thin film as the electrode material of the TFT. However, the voltage drop and voltage fluctuation due to the wiring resistance can be reduced by the shortened wiring.

As high speed operation is required for the driver, the driver is preferably composed of semiconductor elements formed of single crystal silicon.

The thermal expansion coefficient of the glass substrate is larger than the thermal expansion coefficient of the quartz substrate by one order, and is almost the same as the driver made of single crystal silicon. The registration for connecting the driver and the substrate is improved, and miniaturization of the connecting pitch, reduction of the connecting resistance by enlarging the effective connecting area, a decrease in defects in the connecting process, and a decrease in the time required for the connecting process become possible. Breakage of the driver and the substrate, and peeling off at the connecting portion caused by thermal stress also can be reduced.

FIGS. 18 and 19 show an equivalent circuit and a driving waveform of a pixel, respectively. Operation of the TFT can be divided into three parts, that is, (1) a period for charging a liquid crystal capacitor to the signal voltage through the pixel TFT, (2) a period for retaining the charged voltage, and (3) a moment for switching from (1) to (2). The liquid crystal capacitor CLC is connected to a source of the TFT in parallel to a storage capacitor CAD. Image signal VDn for driving the liquid crystal is charged to a drain of the TFT. The TFT closes the circuit in response to the gate signal VGn. The liquid crystal capacitor is charged through the closed circuit TFT, and the potential Vs is elevated to a level of Vd. The liquid crystal is charged to a level represented by the difference voltage between the potential VCOM at the common electrode on the counter substrate side and the voltage Vs. Transmittance of the liquid crystal is controlled by a time averaged value of the difference voltage, i.e. an effective voltage. The transmittance of a respective pixel is controlled independently to display an image as a whole on the LCD. In order to display an image normally, it is ideal that the voltage applied from an external source Vd is equal to the electrode potential of the liquid crystal Vs. However, actually, the wave shape of the voltage Vs is deformed in accordance with the operations (1), (2), and (3) and so a difference is present between Vd and Vs. In order to reduce the deformation caused by the operation (1), the charging power of the TFT must be increased. That means, the mobility must be improved. Further, increasing the ratio of the channel width to the channel length (W/L) of the TFT is also effective. In order to reduce the deformation caused by the operation (2), the off-state current of the TFT must be decreased, and the W/L must be reduced. Normally, as the off-state current is related to the mobility, the mobility of the TFT having a low off-state current tends to be low. In order to reduce the deformation caused by the operation (3), reducing an overlapping width of the gate and the source and reducing the channel width are effective. The less the area of the TFT is, the possibility of a short circuit between lines becomes less. Also, the aperture ratio becomes high as the size of the TFT is reduced. Accordingly, in the case of a transmission type liquid crystal display apparatus, the brightness of the display panel is increased. The deformation caused by the operation (3) becomes small as the size of the TFT is reduced. Therefore, it is desirable to reduce the occupied area WL of the TFT by decreasing the width W and the length L of the TFT as much as possible. It is ideal if the sizes of both the width W and the length L are set to the smallest possible size in the TFT manufacturing process.

However, in consideration of the characteristics of a conventional TFT, the width W and the length L have not been set at an equal size. In the case of a-Si TFT having a low mobility which is at most 0.4 cm$^2$/Vsk, the W/L ratio has been set by setting the length L as the smallest size for the manufacturing and the width W larger than the length L, for example, normally approximately five times the of the length L. On the other hand, in the case of p-Si TFT having a high mobility which is at least 10 and has a high off current, the W/L ratio has been selected by setting the length L as the smallest size for the manufacturing and the width W larger than the length L, usually approximately five times that of the L. As a result, the area occupied by the TFT became normally more than five times that of the minimum manufacturing area WL. Especially for the p-Si TFT, a multi-gate structure (a plurality of the TFTs are connected in a series), or a LDD (Lightly Doped Drain) structure was adopted. The above described p-Si TFT structure increased the occupied area of the TFT. On the other hand, the W/L ratio of the TFT becomes approximately two times that of the maximum manufacturing area WL by setting the mobility of the TFT of a pixel in a range of 0.6 cm$^2$/Vs to 5 cm$^2$/Vs. Thus, the occupied area of the TFT can be less than a half of the conventional area. When peripheral circuits are integrated, it is necessary to consider the delay time of a signal by the peripheral circuits. That is, when the peripheral circuits are integrated, the TFT of the pixel is necessitated to complete the charging the liquid crystal in a time less than approximately a half of the case when the peripheral circuits are not integrated. Accordingly, it is necessary to increase the charging power of the TFT of a pixel, i.e. the mobility, to a level which is higher in comparison with the case when the peripheral circuits are not integrated. Especially, when the mobility of the TFT of the peripheral circuits is low, the delay time by the peripheral circuits increases, and accordingly, the mobility of the TFT of a pixel must be enhanced. When the mobility of the TFT of the peripheral circuit is in a range from 100 cm$^2$/Vs to 300 cm$^2$/Vs, liquid crystal driving with no voltage deformation becomes possible by setting the mobility of the TFT of a pixel in a range from 0.4 cm$^2$/Vs to 5 cm$^2$/Vs. When the mobility of the TFT of the peripheral circuit is in a range from 30 cm$^2$/Vs to 100 cm$^2$/Vs, the mobility of the TFT of a pixel is set in a range from 0.7 cm$^2$/Vs to 5 cm$^2$/Vs. When the mobility of the TFT of the peripheral circuit is in a range from 10 cm$^2$/Vs to 30 cm$^2$/Vs, the liquid crystal driving with no voltage deformation becomes possible by setting the mobility of the TFT of the pixel in a range from 1 cm$^2$/Vs to 5 cm$^2$/Vs.

Among the above-mentioned three sources of the voltage deformation, the voltage fluctuation caused by the operation (3) (referred to hereinafter as a through voltage, Vcgs) is the result of a change in the gate voltage which is revealed at the source electrode through the gate source capacitance of the TFT. That is, Vs decreases by Vcgs from the level Vs=Vd in the operation (1). When the gate voltage is a rectangular shaped wave with no deformation, the value Vcgs is expressed by the following equation;

Vcgs=Vgh.Cgs/(Cgs+CL)

where, Cgs is the capacitance between the drain and source of the TFT, CL is the liquid crystal capacitance (and a sum of the storage capacitance), and Vgh is the height of the gate voltage. Actually, a significant time is necessary for changing the gate voltage from a high level to a low level. During the changing period, the TFT shows a weak conductive state. The conductive state tends to recharge the value Vs to the level of Vd. Therefore, the actual value of Vcgs becomes smaller than a value calculated by the above equation. The voltage increase Vr due to the recharging is proportional to a product of an amount of deformation in the gate signal and the charging power of the TFT, i.e. the mobility. The amount of deformation in the gate signal changes in the display plane. That means that, when the gate voltage is applied at an end portion of the scan lines at the display portion, the amount of the deformation increases as the gate signal travels to the other end portion of the scan lines by the effect of the line capacitance and line resistance. Accordingly, Vcgs has a distribution in the plane, that is, the display becomes non-uniform. Especially, when the line capacitance and the line resistance increase in accordance with an increase in the display area, such as at least three inches, the above non-uniformity becomes significant. The non-uniformity becomes further significant when the charging capacity of the TFT is large. In a case when the peripheral circuit is integrated, the amount of deformation of the scanning signal which is supplied to the display portion becomes larger than that of non-integrated case. Therefore, the non-uniformity becomes a serious problem. When the number of gray scales increases, reversal of the gray scales is generated, and a normal display becomes impossible. In order to solve the above described problems, the mobility of the TFT of the pixel is set at most at 5 cm$^2$/Vs, preferably at most at 3 cm$^2$/Vs.

The manufacturing rule of the driver pattern can be at most 1 μm, preferably at most 0.5 μm, by setting a dynamic range of the liquid crystal driving source voltage of the image signal driver at most at 5 V, preferably at most at 3 V. Accordingly, the area of a chip can be reduced remarkably. The manufacturing size of the driver is smaller than the manufacturing size of the TFT by one order. In accordance with the above manufacturing requirement, the chip can be reduced farther in size and in consuming power than a case when all of the driving functions are integrated on the substrate. Further, the outer size of the liquid crystal display apparatus can be reduced remarkably. The area of the chip can be reduced to at most 0.1 mm$^2$ per pin output. An output greater than 200 or 300 pins per driver becomes possible. The liquid crystal display apparatus can be driven by one or two drivers and the peripheral circuits. A display information generating circuit and memory circuits for generating display information can be included in a driver. The display information generating circuit and the memory circuits for generating display information can be integrally formed by the same process as for the liquid crystal driving voltage generating circuit.

BRIEF DESCRIPTION OF THE DRAWINGS

These and other objects, features and advantages of the present invention will be understood more clearly from the detailed description with reference to the accompanying drawings, wherein.

DESCRIPTION OF PREFERRED EMBODIMENTS

Preferred embodiments of the present invention are described in detail hereinafter.

Figure 1:
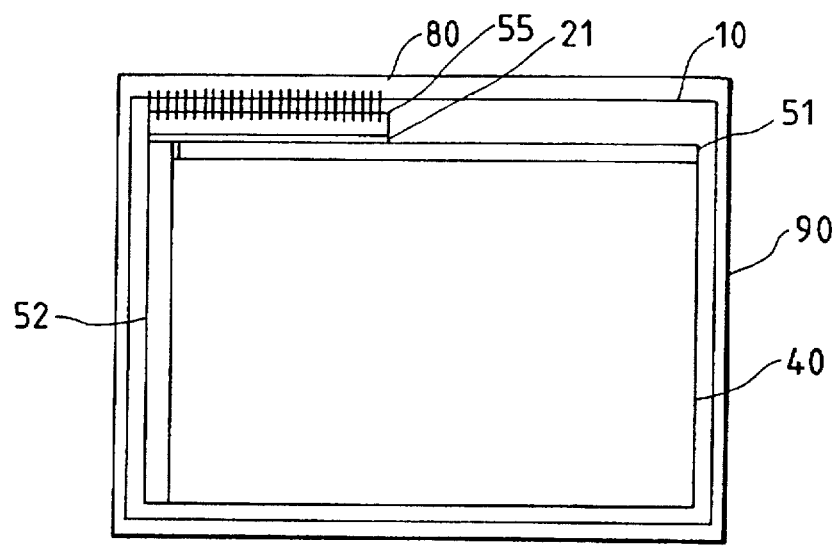
FIG. 1 is a schematic plan view of a liquid crystal display apparatus forming an embodiment of the present invention.

FIG. 1 is a schematic plan view of the liquid crystal display apparatus in the first embodiment of the present invention. A display region 40 of an active matrix type is mounted on a glass substrate 10, and an image signal side peripheral circuit 51 and a scanning signal side peripheral circuit 52 are integrated at the periphery of the display region 40. Further, a driver for the image signal 21 is mounted on the substrate by a COG method. Signals from an interface circuit, which is not shown in the figure, located at a rear side of the substrate, are led by a flexible print circuit (FPC), which is connected to an end of thin film line 55 on the glass substrate. Another end of the thin film line 55 is connected to an image signal side peripheral circuit 51 and a scanning side integrated circuit 52. All of the above members are enclosed in a case 90 to form a liquid crystal display apparatus.

Figure 2:
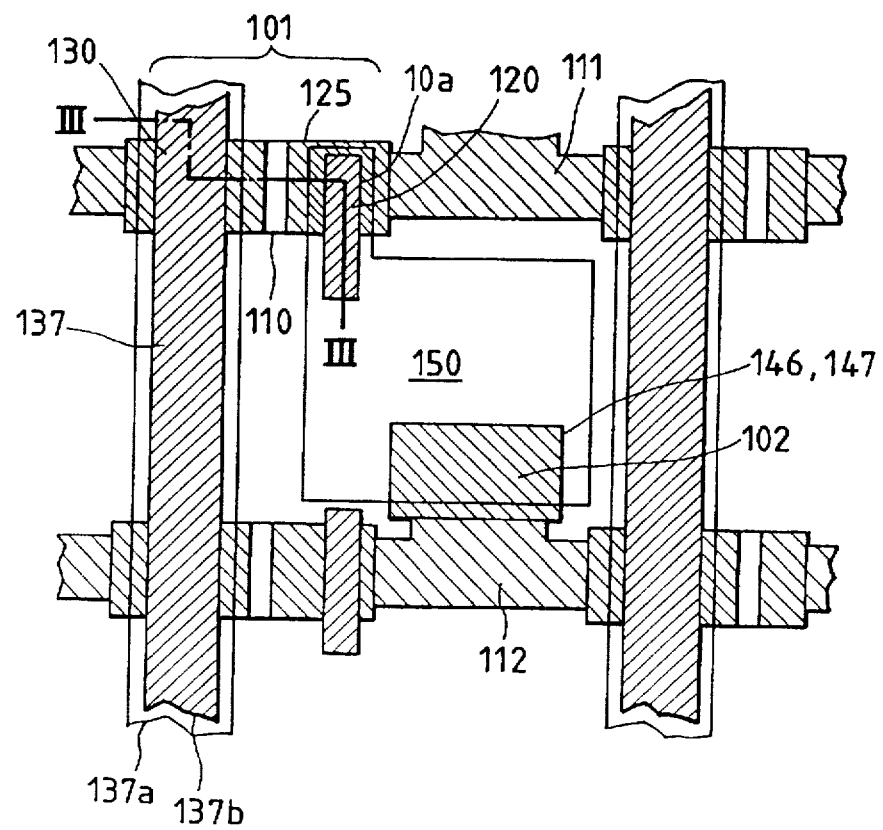
FIG. 2 is a partial plan view of an active matrix substrate.
Figure 3:
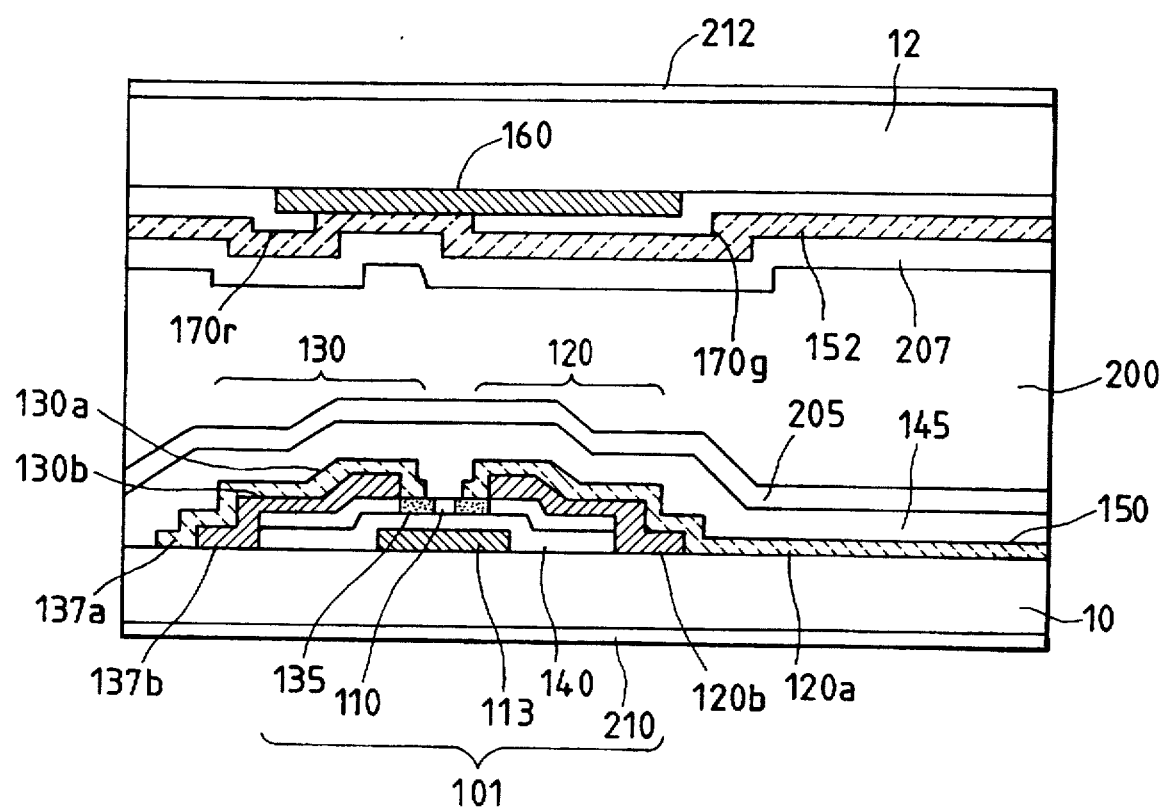
FIG. 3 is a cross sectional view of a structure of the liquid crystal cell taken along the line III—III in FIG. 2.

FIG. 2 is a plan view of a pixel in the display region. FIG. 3 is a cross sectional structure taken along the line III—III in FIG. 2. The TFT 101 is an invert staggered type TFT having an active layer 110 made of hydrogenated amorphous silicon (a-Si). The active layer, a source electrode 120, and a drain electrode 130 are connected through contact layers 125, 135 made of n+ type a-Si. The source electrode 120, the drain electrode 130 and the image signal line 137 have a double-layer structure made of molybdenum 137 and ITO 137b. Gate electrode 113 and the scanning signal line 111 are made of aluminum. Gate insulating film 140 is made of SiN. The liquid crystal 200 is TN-type, and is enclosed between the glass substrates 10 and 12. Alignment layers 205, 207 are respectively formed so as to face the planes of the glass substrates, and the alignment directions of the liquid crystal are rotated so as to cross mutually by 90 degrees in a gap between the two glass substrates. Back lights, which are not shown in the figure, are located at the rear side of the glass substrate 10 to project light to the liquid crystal. At outer sides of the glass substrate, polarizers 210, 212 are provided. The amount of transmissive light is controlled by a voltage applied to the liquid crystal to cause an image to be displayed. An end of the respective scanning signal line and image signal line is connected to the peripheral circuit at a peripheral portion of the glass substrate.

FIG. 3 is a cross sectional view of a cell for a pixel, wherein the liquid crystal is enclosed in a space between the active matrix substrate and facing another substrate. On the surface in contact with the liquid crystal of the glass substrate 10, the TFT, the pixel electrode 150, the protecting film 145, and other numbers are formed by the same method as indicated above. On the above members, the alignment layer 205 for aligning orientation of the liquid crystal molecules is formed by spin coating and a rubbing treatment. At the opposite surface of the above plane, the polarizer 210 is formed. At the inner surface of the counter substrate, a black matrix made of chromium for shielding light which has leaked from a region other than the pixel electrode, a color filter 152 formed by roll-coating of an organic resin and subsequent dyeing, counter electrodes of ITO, 170r and 170g, and an alignment layer 207 are respectively formed in this order. At the outer surface, the alignment film 212 is formed. Beads are spread between the two substrates to make the gap between the substrates approximately 5 μm. The periphery of the substrates is provided with a resin coating, although it is not shown in the figure, and subsequently, a nematic liquid crystal is filled into the gap and sealed. The polarizing directions of the polarizers 210 and 212 are so arranged as to cross at a right angle, and the rubbing directions of the alignment films 205 and 207 are arranged so as to cross at a right angle. The display mode is normally a white mode, wherein light transmits through the liquid crystal when a voltage is not applied.

Figure 4:
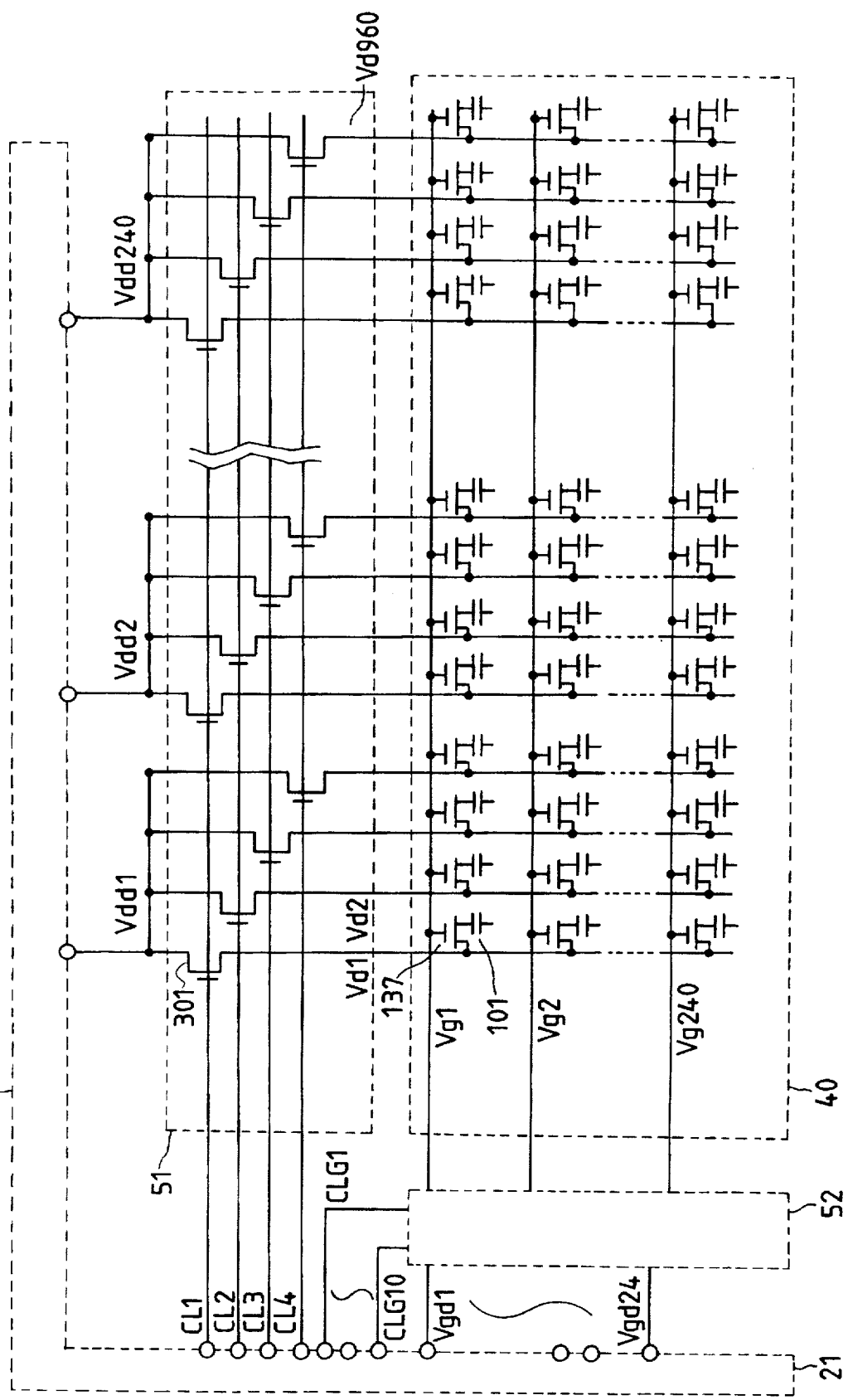
FIG. 4 is an equivalent circuit of the pixel and the peripheral circuit of the liquid crystal display apparatus shown in FIG. 1.

FIG. 4 is an equivalent circuit of the peripheral circuit and a display region having vertical 240×lateral 320 pixels (240×320×3 colors dots). Both the image signal side peripheral circuit 51 and the scanning signal side peripheral circuit 52 are of the switch matrix type. Taking the image signal side circuit for example, the image signal from the driver and Vdd1–Vdd240 are branched by the TFT so as to be supplied to the image signal lines and the scanning signal lines. Branching of the signal is controlled by a switching operation of the TFT involving sampling of clock pulses from CL1 to CL4. The scanning signal side circuit is composed in the same manner as the scanning signal from the driver, and Vgd1–Vgd 24, are branched to 240 scanning signal lines from Vg1 to Vg240 by 10 clock pulses. The 240 image signal lines are driven by 240 image signal terminals, and 960 image signal lines and the 240 scanning signal lines are driven by 24 scanning signal terminals. That means, the number of the driver IC and connection can be reduced to an amount equal to or less than ¼.

Figure 5:
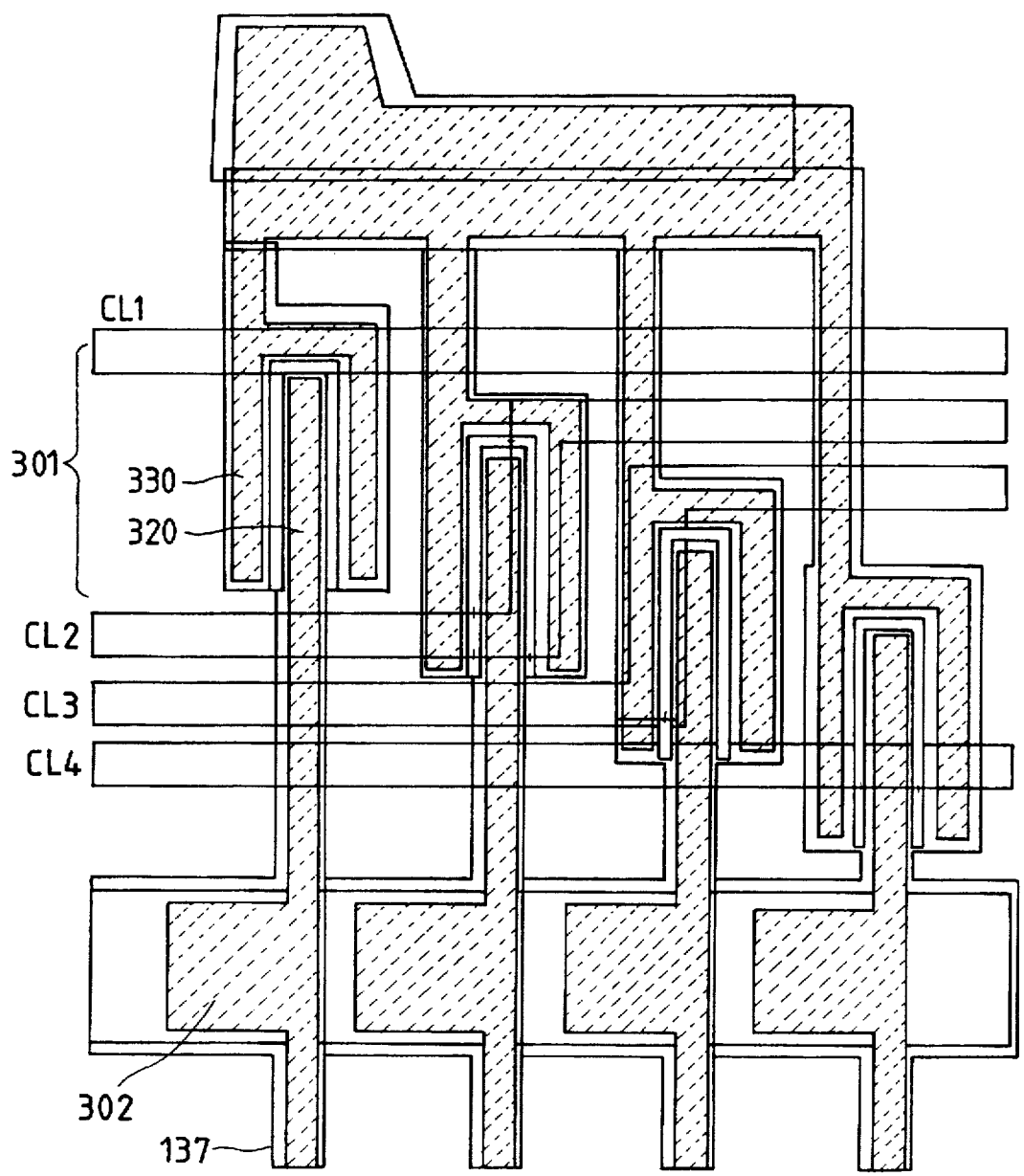
FIG. 5 is a partial plan view of the peripheral circuit shown in FIG. 1.
Figure 6A:
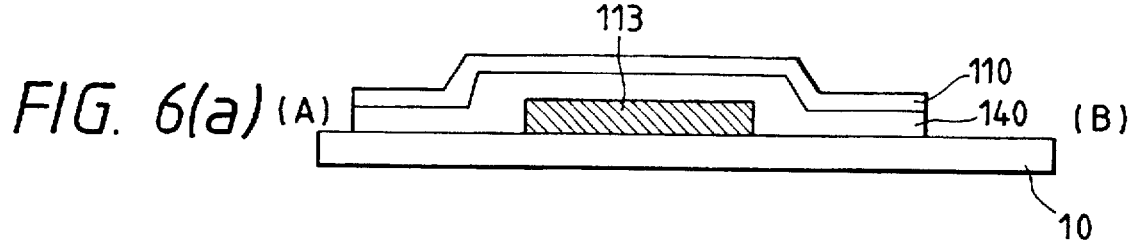
FIGS. 6(a), 6(b), 6(c), 6(d), 6(e), and 6(f) are cross sectional views at each the steps in manufacturing of the TFT.
Figure 6B:
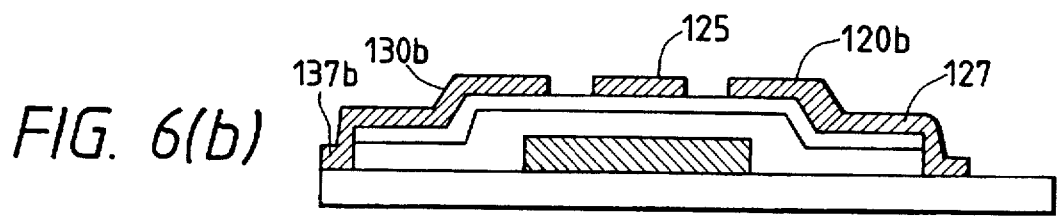
Figure 6C:
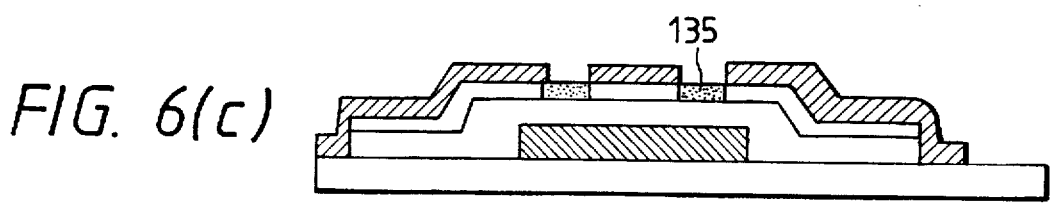
Figure 6D:
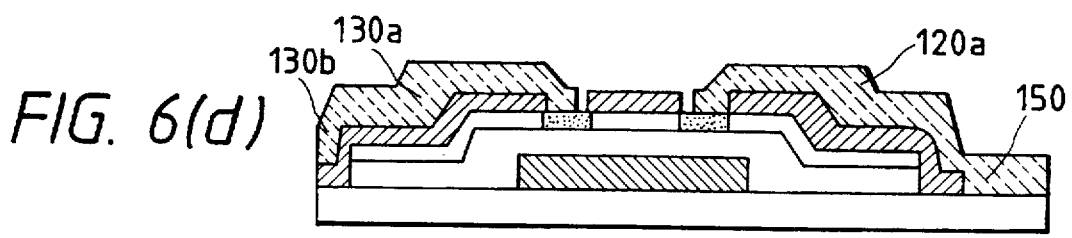
Figure 6E:
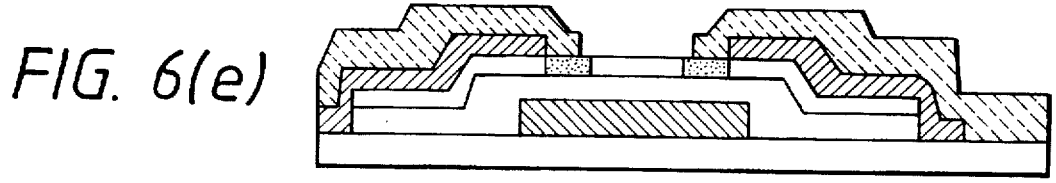
Figure 6F:
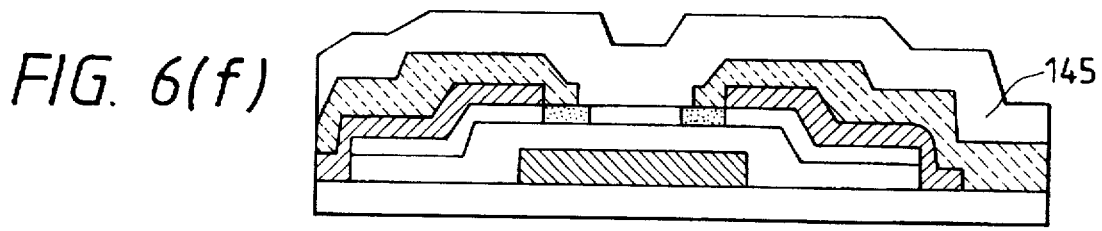

FIG. 5 is an illustration showing a partial plan structure of the peripheral circuit at the image signal side. The circuit portions corresponding to four image signal lines from 4n+1 row to 4n+4 row are shown. Connecting terminals of the driver are connected to the drain electrodes 330 of the four TFT301. The source electrodes 320 of the circuit TFT are respectively connected to the corresponding storage capacitor 302 and the image signal line 137. Clock lines CL1, CL2, CL3, and CL4 correspond to the scanning signal lines in the display portion, and are connected to the gate electrode in the circuit TFT. The clock line has a twice bent shape in order to reduce the circuit area. Therefore, the length of the line is increased. In order to make the line resistance equal to the other two lines, the width of the clock lines was made wide. Accordingly, a fluctuation of the displayed color caused by a mutually different delay time can be avoided. The structure and manufacturing process of the circuit TFT is the same as the TFT of the display portion, except for the active layer, which is made of laser annealed poly-silicon. That is, the source and drain electrodes and lines are composed of two-layer lines made of metals and ITO, wherein a silicon layer is deposited under the line layer. The channel 310 of the TFT was shaped as a U-letter. Accordingly, the width of the channel can be increased twice without increasing the parasitic capacitance between the gate sources. That means that the driving power of the circuit can be increased without increasing the effects of the gate voltage wave forms. The structure of the storage capacitor 302 is the same as the structure of the display portion. The above-explained circuit patterns are aligned with a total of 240 per four image signal lines. In this case, the circuits can be divided into blocks smaller than the width of a laser beam, as shown in FIG. 1, and each respective block can be arranged separately with an interval of 100–500 μm between respective blocks. In the above case, the effects of fluctuation in characteristics of the TFT at overlapped portions of the laser beam in the laser annealing process can be reduced. The peripheral circuit on the scanning side is composed approximately in the same manner as FIG. 5. The only difference concerns the connecting points of the source of the circuit TFT and the scanning signal lines, i.e. the gate metallic layer. That is, it concerns the connecting points of lines in mutually different layers.

Next, a manufacturing method of the liquid crystal display apparatus will be explained hereinafter.

FIGS. 6(a), 6(b), 6(c), 6(d), 6(e), and 6(f) are cross sectional views showing the configuration at each of the main steps in the manufacturing method of the TFT for the display portion of the present invention. The TFT for the circuit portion is manufactured by approximately the same method as the above-described method. In any case, the TFT101 is formed on the glass substrate 10. The glass substrate 10 is made of $SiO_2$ as a main component, including $Al_2O_3$, $B_2O_3$ by respectively 11%, 15%, and other oxides by 25%. The strain point is 593° C., and the thermal expansion coefficient is $46 \times 10^{-7}$/k.

First, a chromium film is formed to 120 nm thick on the glass substrate 10 by a sputtering method, and an unnecessary portion is eliminated by photolithography to form the gate electrode 113. The etching agent is a ceric nitrate group etchant. Subsequently, a SiN film 140 and a-Si film 110 are continuously deposited, respectively, at the substrate temperature of 300° C. to 350 nm thick and 270° C. to 40 nm thick by a plasma CVD method. Then, a-Si film in only the region where the peripheral circuit will be formed is crystallized by laser annealing using an XeCl excimer laser. The laser irradiation was performed in a vacuum with an energy density of 200 mJ/cm². In order to prevent deterioration of the characteristics of the a-Si TFT, heating for dehydrogenation treatment before the irradiation is not performed. Further, heating of the substrate during the irradiation is not performed for the same reason. Conversely, when depositing the a-Si films, the hydrogen concentration in the film was kept at least at 15%, especially the concentration of hydrogen connected with silicon atoms in a chain like ($SiH_2$) was kept high, and a poly-Si TFT having preferable characteristics was obtained. The bond structure of hydrogen can be evaluated by an infrared absorption spectrum, and a desirable absorbing peak wave number is in a range from 2020/cm to 2060/cm, preferably from 2030/cm to 2050/cm. By selecting such a wave number, the mobility of the TFT can be made to be 10 $cm_2$/Vs.

Next, the laminated films made of SiN 140 and a-Si 110 are manufactured as an island (FIG. 6 (a)) so as to cover the gate electrode by photolithography. For the etching, a dry etching method using a mixed gas of trifluorochlorocarbon ($CClF_3$) and oxygen was used. If an a-Si film containing a large amount of hydrogen in the peripheral region is annealed using a laser, the surface of the film becomes roughened, and sometimes pin holes are generated. In the above case, there is a possibility that the etchant comes into contact with the gate insulating film. In the present embodiment, the etching was performed using a dry etching method, which had a small etch rate with SiN. Therefore, even if a pin hole exists in the silicon, damage to the gate insulating film does not occur.

Subsequently, a molybdenum (Mo) film of 200 nm thick is deposited at a substrate temperature of 160° C. by a spattering method. At the boundary of the a-Si and the Mo films, a silicide layer MoSi 127 is generated by a solid phase reaction between the a-Si and Mo. Then, the Mo film is treated with a photoetching process using a mixture of phophoric acid and acetic acid (PAN solution). That means that other portions than the channel portions 125, source electrode portions 120b, drain electrode portions 130b, and signal line portions 10b will be eliminated (FIG. 6 (b)). The silicide layer, MoSi, remains at the surface of the a-Si film, because MoSi is insoluble in the PAN solution. Then, highly doped silicon layers (contact region) 135 are formed by implanting phosphor (P) atoms in the a-Si film using an ion doping method (FIG. 6 (c)). An ion irradiation apparatus of non-mass separated type was used for the ion doping, and helium diluted phosphine was used as a low material gas. The acceleration voltage was 10 kV, and the ion dose was $10^{15}$atoms/cm². In the above case, if the substrate temperature is elevated to 300° C., for example, the P atoms doped into the a-Si are activated, and additional activation, such as laser irradiation or heat treatment, can be omitted. Naturally, the additional activation treatment, such as heat annealing, may be optionally performed to improve the characteristics.

Subsequently, an ITO film of 140 nm thick is deposited at a substrate temperature of 220° C. by a spattering method.

The ITO film is fabricated in the shapes of the pixel electrodes 150, source electrodes 120a, drain electrodes 130a, and signal lines 137 (not shown in the figure) by lithography using HBr solution (FIG. 6 (d)). Then, using a respective ITO electrode for a mask, the Mo film is eliminated by etching using the PAN solution. That means eliminating the Mo at channel portions of the TFT which are not covered with the ITO (FIG. 6(e)). Then, the MoSi at the channel portion is eliminated by a plasma asher using oxygen or dry etching using chlorine or trifluorocarbon, for example. In the above case, the characteristics of the TFT obtained by using the oxygen asher is preferable, and the oxygen asher is desirably used for the process. It is assumed that plasma damage to the a-Si film and over etching can be prevented by forming a stable very thin oxide film on the surface simultaneously with elimination of the silicide, and further, the capture level at the surface can be reduced. The film thickness of the oxide film in the above case is desirably at most approximately 30 nm, and preferably at most 10 nm, in order to suppress generation of stress. Subsequently, a SiN film 145 is deposited by a plasma CVD method to provide a protecting film for the TFT. Finally, although the procedure is not shown, the SiN film is photo-etched in the same manner as the gate insulating film to expose terminals of the signal lines and the gate lines for completion of the TFT.

In accordance with the present embodiment, the storage capacitor 102 is formed by using the pixel electrode 150 and the gate line 112 in a row adjacent to the pixel electrode 150 as for electrodes, as shown in the plan view of FIG. 2. The storage capacitor is connected in parallel with the liquid crystal capacitor and has an effect to prevent a voltage effect due to leakage current when the liquid crystal is driven by the active matrix substrate of the present invention.

In the above embodiment, the source electrode and the drain electrode are provided on the gate electrode and the semiconductor, but the shape of the electrodes can be altered without departing from the spirit of the present invention. For example, the metallic layers of the source electrode 120b and the drain electrode 130b are not retained on the silicon film, but contact only by laminated layers of n+Si, silicide, and ITO can be used.

In the above embodiment, chromium was used as a material for the gate electrode. However, other metals, such as, for example, Al, Cu, Ta, Ti, and others, and their laminated films, or their alloys, can be used. When the Al and Cu group is used, the line resistance is decreased, and accordingly, uniformity in a plane of the displayed image of the LCD can be improved.

In the present embodiment, the SiN film was used for the gate insulating material, but films made of $SiO_2$, SiON and others may be usable. When one of Al and Ta is used as the material for the gate line material, as improved withstand voltage and prevention of a short circuit of the insulating film can be realized by using the oxide film obtained by anodic oxidation of Al, Ta as laminated films.

In the above embodiment, the semiconductor film was made of an a-Si film by a plasma CVD method, or a polycrystalline Si film obtained by a laser annealed s-Si film, but other materials and other methods can be used for the semiconductor. For instance, a Ge film deposited by a plasma CVD method using germane gas for the material gas, or a mixed crystal film or superstructured film of Ge and Si, can be used for improving the characteristics of the TFT.

As for the method of depositing the semiconductor film, any of a reduced pressure CVD method with no plasma damage, a spattering method capable of reducing the hydrogen content in the film, or an ECR-CVD method can be used for preventing instability of the film and decreasing the process temperature. As for the semiconductor film, a microcrystalized film of Si can be used for obtaining high mobility. The TFT having high mobility can be obtained by annealing the semiconductor film by heating or laser processing to form a polycrystalline film. In the above case, even if the hydrogen content in the film before the annealing is high, a defect of the gate insulating film due to pin holes in the crystallized film will hardly be generated.

In the present embodiment, Mo was used for the source drain electrode. However, other metals, such as Ti, Ta, Cr, Pd, Mn, Co, Ni, and Pt, any of which reacts with the semiconductor to form a silicide or germanium compound, can be used. Further, alloys and laminated films including the above metals can be used.

Figure 17:
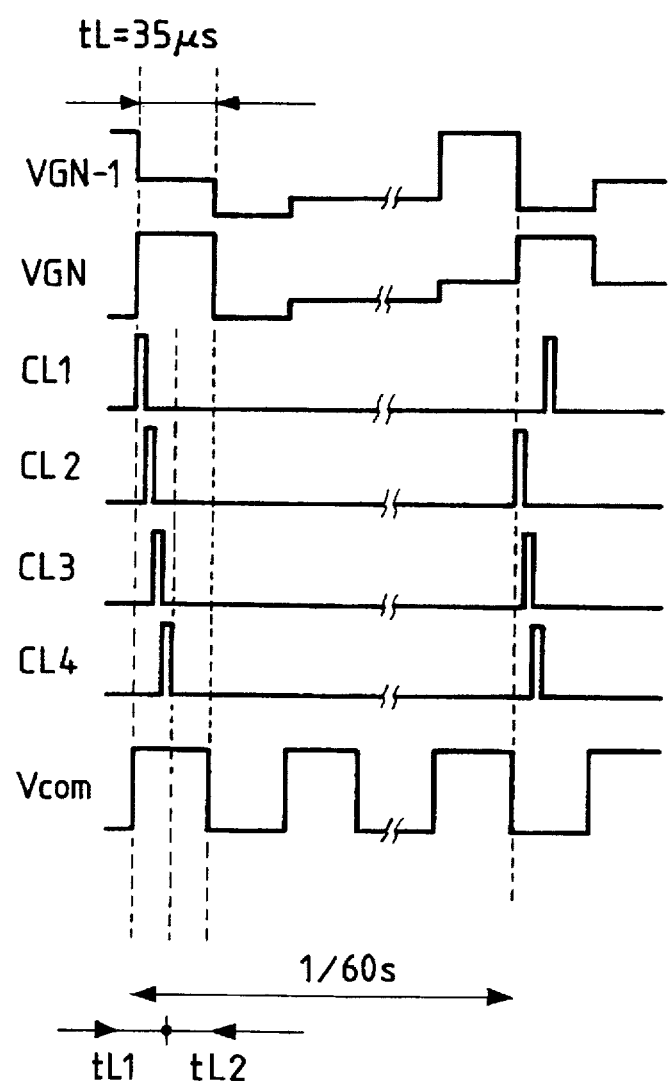
FIG. 17 is a signal wave form diagram of the liquid crystal display apparatus.
Figure 18:
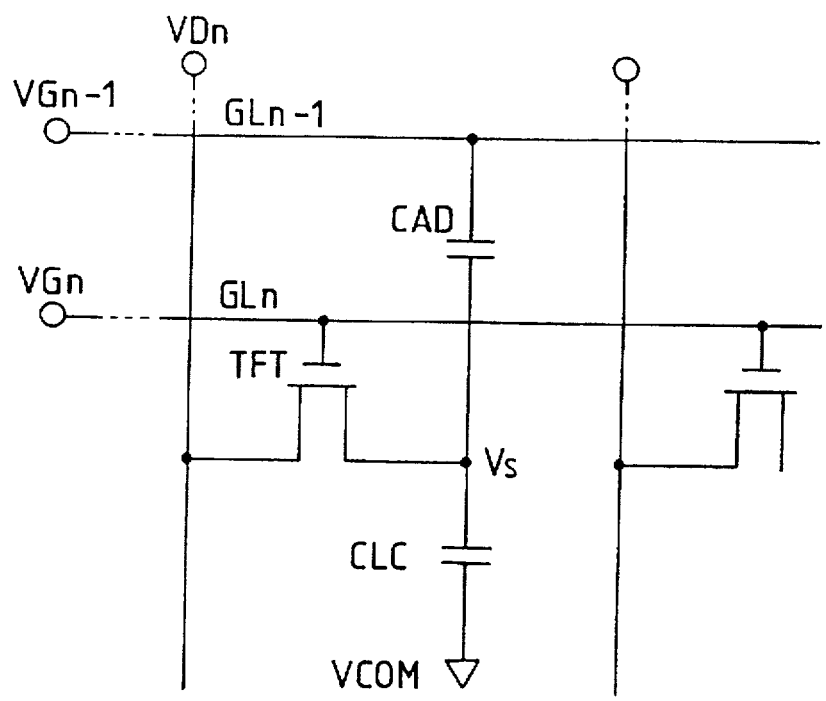
FIG. 18 is an illustration showing an equivalent circuit of a pixel.
Figure 19:
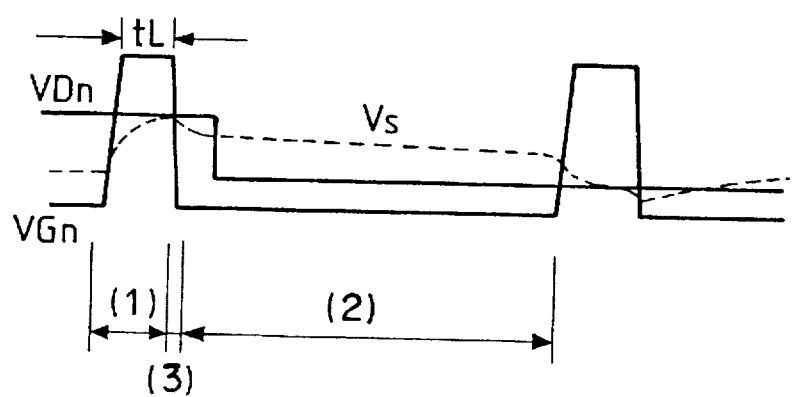
FIG. 19 is a driving wave form diagram of a pixel.

FIG. 17 shows an outline of the driving wave forms of the liquid crystal display apparatus at four rows at the left most ends of the display portion. The circuit TFTs are turned on in order by the clock signals CL1, CL2, CL3, and CL4 in a front half tL1 of the line selecting time tL (35 μs) of the pixel. Correspondingly, the driver switches the data Vdd1 in a time of ⅛ of the line selecting time tL. The image signals Vd1, Vd2, Vd3, and Vd4 are charged to respective signal lines. The above signals are charged to liquid crystal capacitors by the TFT of the pixel at a back half time tL2. The image signal VD supplied by the signal line (drain line) is applied to the liquid crystal by making the pixel TFT (orderly scanning line) conductive by applying a voltage in order (from $VGn_{-1}$ to VGn, and subsequently the next row, although it is not shown in the figure) to the gate lines (scan lines). The liquid crystal is driven by a voltage representing the difference between the potential VCOM of the common electrode at the counter substrate side and VDn, and thereby the light transmittance at the pixel is changed. The transmittance is controlled independently for each respective pixel, and an image is displayed as a whole on the LCD.

Figure 9:
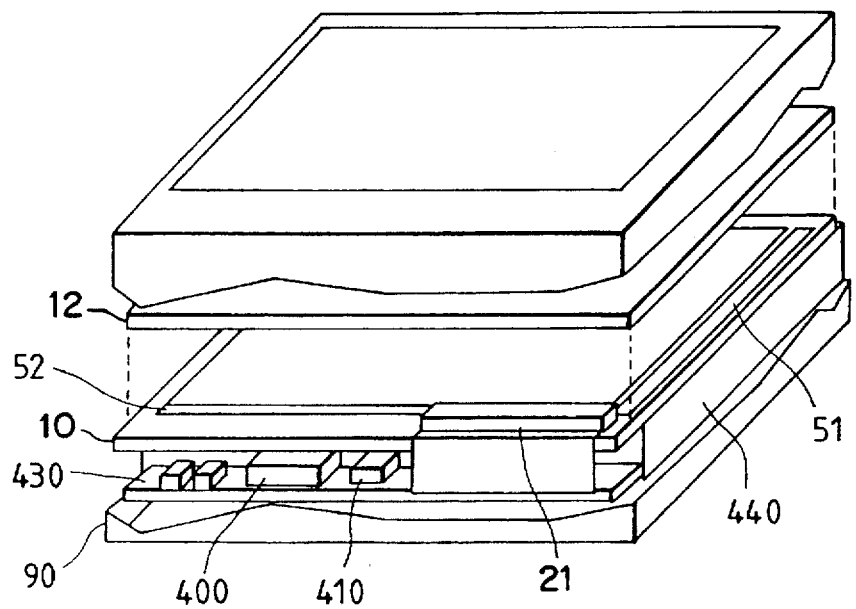
FIG. 9 is a perspective view showing the structure of the liquid crystal display apparatus forming an embodiment of the present invention.

FIG. 9 is a schematic perspective view of a liquid crystal display apparatus using the above-explained liquid crystal. The driver 21 is mounted on the active matrix substrate 10 of the liquid crystal cell by a COG method. The driver 21 has a function to generate the scanning signal, the image signal, and the clock signal. Output terminals of the driver are connected to the scanning side peripheral circuit 51 and the image signal side peripheral circuit 52. The signal and power source for driving the driver IC, is supplied from the printed substrate 430 through a flexible print circuit (FPC). On the printed substrate, a signal processing circuit composed of ICs, such as a timing converter and other members, and a gray scale voltage generating circuit 410 corresponding to respective gray scales, which are displayed by the liquid crystal, are mounted. Back lights 440 were provided at the rear side to the active matrix substrate. As shown, the driver 21 is outside of the region covered by the other substrate 12. The above described members were enclosed in a case 90.

Figure 7:
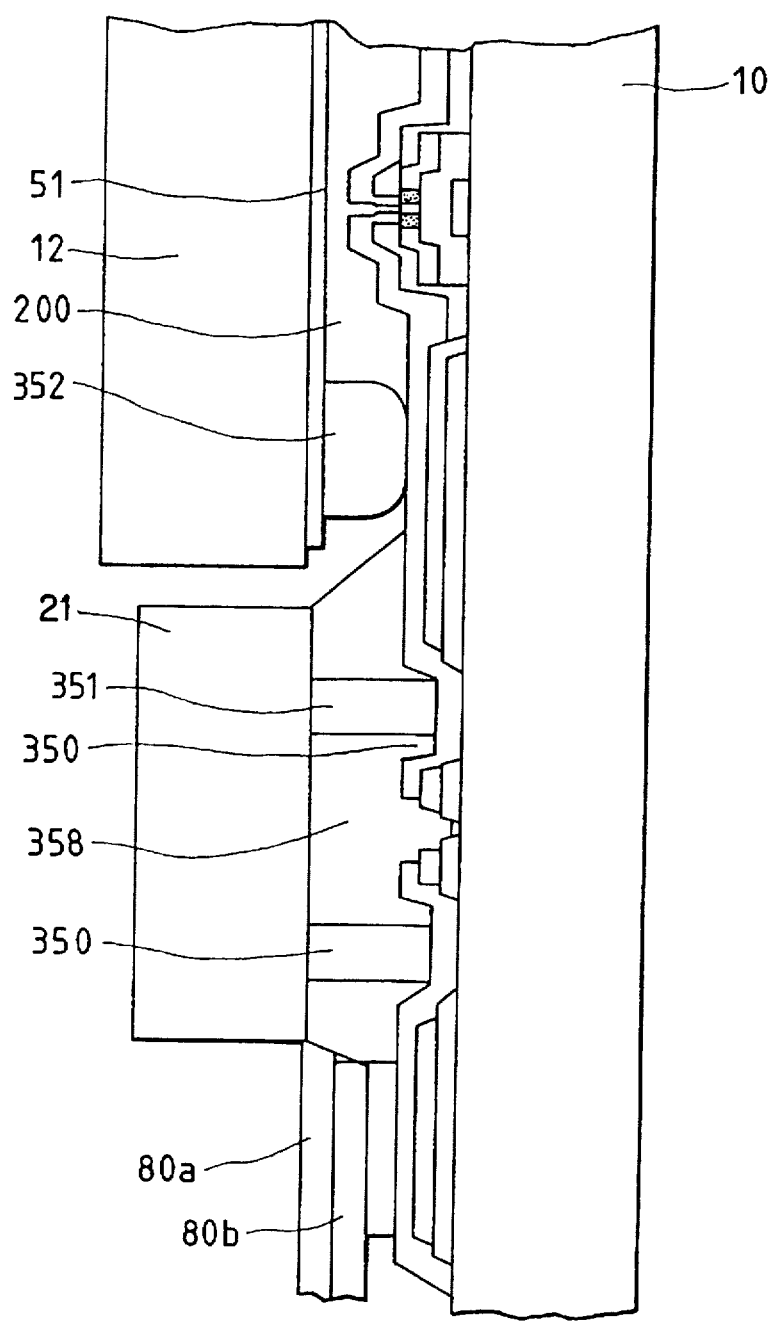
FIG. 7 is a cross sectional view of a connecting portion of the peripheral circuit including a driver according to an embodiment of the present invention.
Figure 8:
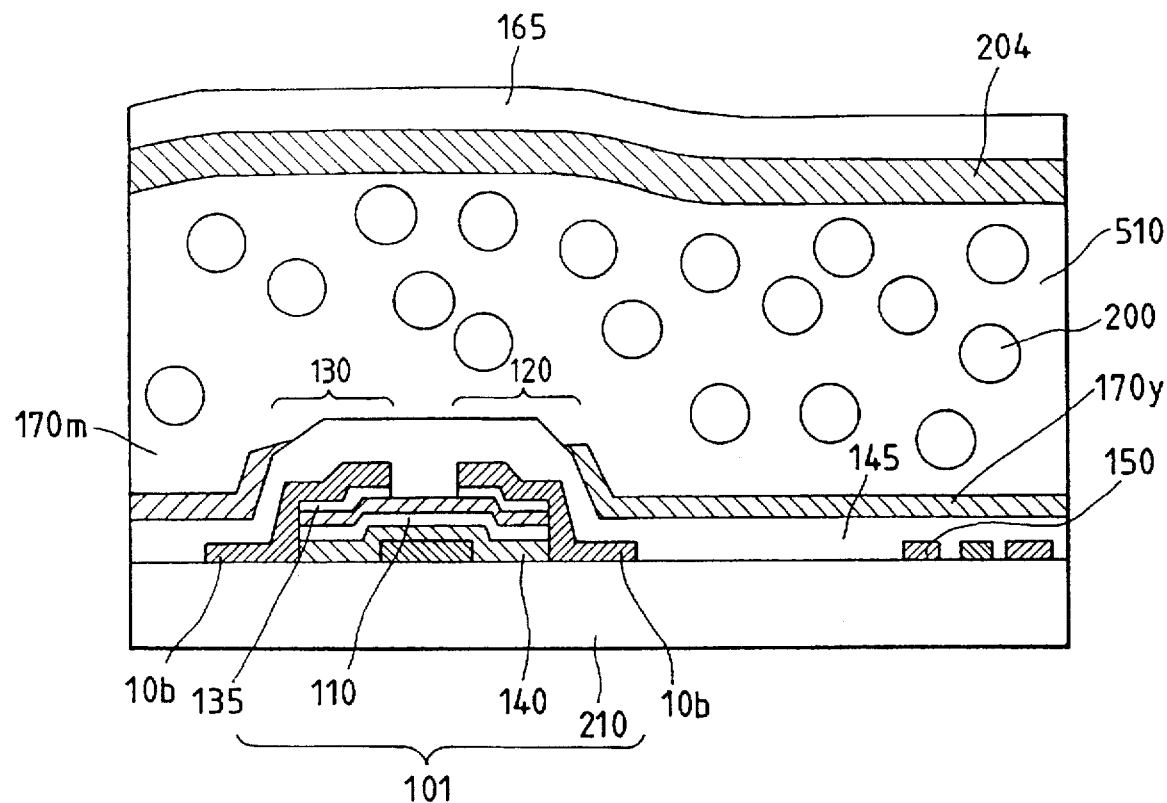
FIG. 8 is a cross sectional view of the liquid crystal cell using PDLC.

FIG. 7 is a schematic cross sectional view of the driver and the glass substrate formed by a COG method. Among various COG methods, a microbonding method was used. An AU bump 350 is formed at the output terminal of the driver 21, and the bump is directly connected to the I terminal 351 of the image signal line on the glass substrate 10. The driver is fixed by a UV-curable polymer 358 which is applied between the driver and the glass substrate. The resin shrinks at curing, and the AU bump and the ITO terminal 351 are directly pressure welded by compressive stress. Contact resistance of the microbumpbonding is approximately 1 ohm. A reduction of the line resistance was accomplished by laminating chromium for the gate line material, molybdenum for the image signal line material, and ITO. The liquid crystal panel terminal and the interface circuit are connected by the FPC, (base material 80a, copper foil 80b). The peripheral circuit is formed within a vicinity of 2 mm wide of the seal 352 of the liquid crystal cell. The vicinity of the seal has non-uniform display characteristics because of impurities contamination, non-uniform rubbing, and other reasons. Further, in consideration of manufacturing preciseness, the seal and a region of approximately 2 mm wide inside the seal are formed as a non-display region. Conventionally, the above non-display region has been a dead space. However, in accordance with the present invention, the region is utilized for the peripheral circuit. Accordingly, the outer size of the liquid crystal display apparatus can be reduced relative to the size of the display region. In the present embodiment, a switch matrix type circuit was used as the peripheral circuit. The consuming power of the above circuit is smaller than that of the shift register circuit using an invertor. Accordingly, heat generation at the circuit is small, and the liquid crystal is not heated locally and has an uniform temperature distribution even if the circuit is formed in the liquid crystal cell. Therefore, uniform display without irregular display can be obtained.

In accordance with the present embodiment, a PDLC liquid crystal (Polymer Dispersed Liquid Crystal) can be used for the liquid crystal. The PDLC is a polymer film of which pores are filled with liquid crystal material, and is obtained by phase separation of a homogeneous solution of the liquid crystal material and the polymer material by polymerization reaction. For instance, the liquid crystal was E-8 made by BDH Co., and a mixed solution of 2-ethylhexyl acrylate, urethane acrylate, and photopolymerization initiator was used as for the polymer material. After filling the mixed solution into the liquid crystal cell, the PDLC was obtained by photopolymerization. In the above case, the polarizers 212, 210, alignment films 207, 205 in FIG. 3 become unnecessary. By omitting the polarizer, the transmissivity increases by two times, and an improvement in the display brightness and a reduction in the power consumption can be realized effectively.

Further, the area per connecting terminal can be increased, malfunction can be prevented, and consuming power can be decreased. Also, the manufacturing yield can be improved, especially a remarkable improvement is achieved in the case of so-called chips of the string shape, which is a large size driver chip having multi-terminals with a small width. Therefore, further multiplying the terminals and thinning the width of the string chip become possible. The width of the non-display region at outer periphery of the liquid crystal display apparatus can be decreased. The size of the display region can be increased relative to the outer size of the liquid crystal display apparatus.

In accordance with the present embodiment, a ratio of the channel width and the channel length of the TFT of the pixel can be made 1 by setting the mobility of the TFT at the display portion in a range from 1 to 3 $cm^2/Vs$ and by setting the off-state current to 100 pA. Accordingly, the aperture ratio of the display region is increased, the panel brightness is improved, and the power consumption of the back light can be reduced. A signal of 30 MHz can be generated by making the mobility of the driver 800 $cm^2/Vs$. Operation of the switch matrix circuit becomes possible by making the mobility of the peripheral circuit fall in a range from 10 to 30 $cm^2/Vs$. Further, a fluctuation of the voltage change in the plane due to the capacitance between the source and the drain at the turn off time of the TFT can be reduced by making the mobility of the integrated circuit fall in a range from 100 to 300 $cm^2/Vs$.

The consuming power can be decreased by setting the switching time of the thin film transistor of the display pixel to 30 μs–60 μs, the switching time of the thin film transistor of the integrated circuit on image signal side to 3 μs–12 μs, and the switching time of the transistor of the driver to 0.01 μs–0.03 μs. Also, the electromagnetic radiation can be decreased, the heat generation of the circuits can be decreased, the heat generation of the silicon can be decreased, and the area of the silicon element can be reduced.

Precise manufacturing of the display pixel becomes possible by setting the switching time of the thin film transistor of the display pixel to 30 μs–60 μs, the switching time of the thin film transistor of the integrated circuit at image signal side to 3 μs–12 μs, and the switching time of the transistor of the driver to 0.01 μs–0.03 μs.

As the drivers are collected to one side, the man-hours necessary for connection can be reduced. If the driver is collected to a short side, the area of the frame region relative to the display area can be reduced. As the area of the glass substrate is small, the number of the glass substrates taken from one glass mother board increases, and the production cost can be decreased. When the drivers are collected to a long side, a fluorescent tube, serving as a back light of the photoconductive body type, is provided at a region under the drivers. The light from the fluorescent tube is projected in the short side direction of the back light. Therefore, irregularity in the light intensity distribution can be reduced. The light intensity of the fluorescent tube can be weak. Other devices can be mounted adjacent to the drivers. For instance, the size of a substrate of the timing convertor for converting signals for the CRT to signals for the LCD can be reduced or the substrate can be omitted. The above effect is advantageous for decreasing the size of the liquid crystal display apparatus.

The electromagnetic radiation from the liquid crystal display apparatus can be reduced, and the leakage of data to others who may intercept the electromagnetic radiation can be prevented.

Figure 11:
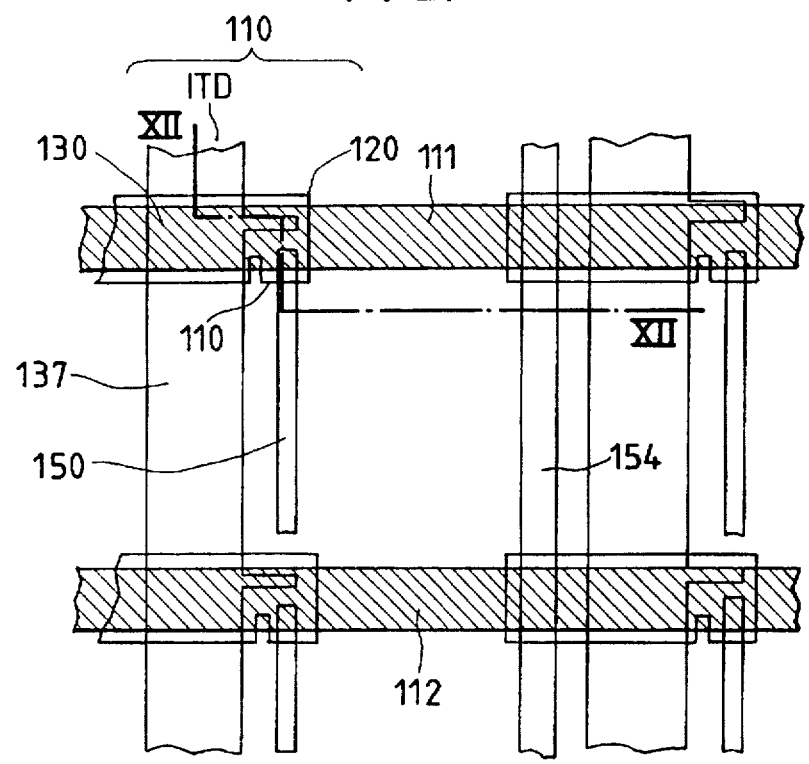
FIG. 11 is a partial plan view of the active matrix substrate.
Figure 12:
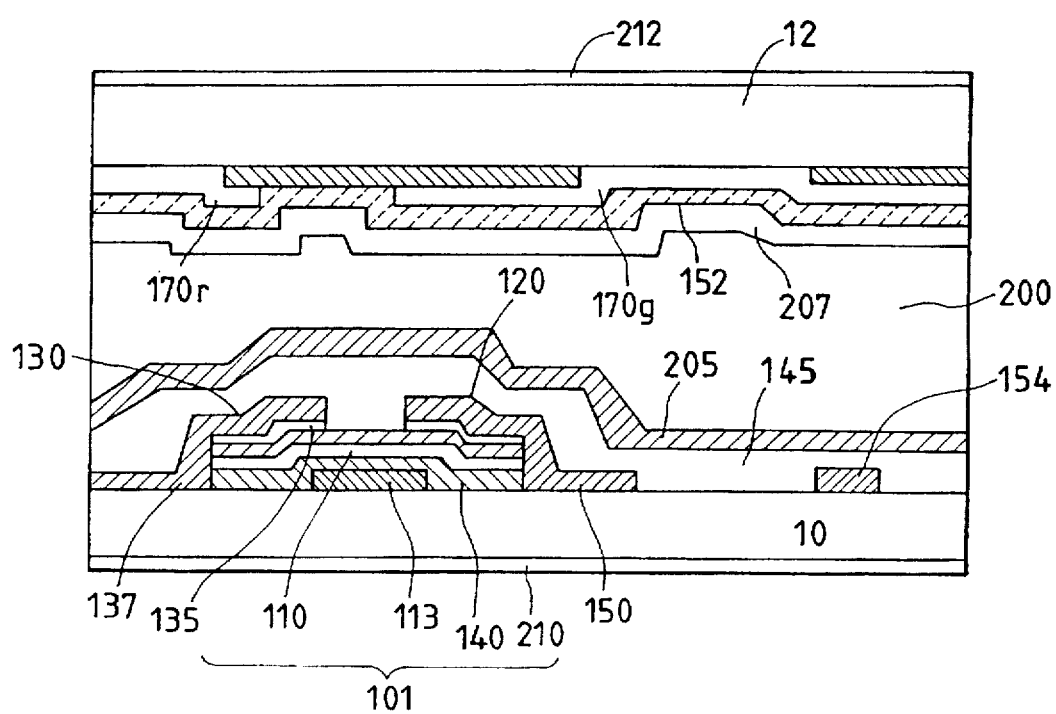
FIG. 12 is a cross sectional view of structure of the liquid crystal cell taken along the line XII—XII in FIG. 11.

As a second embodiment of the present invention, an embodiment of a lateral electric field type liquid crystal display apparatus will be described hereinafter. FIG. 11 is a partial plan view of a pixel in a lateral electric field type liquid crystal display apparatus. FIG. 12 is a cross sectional view taken along the line XII—XII in FIG. 11. The scanning signal line 111 and the gate electrode 113 are made of chromium. The image signal line 137, the source electrode 120, the drain electrode 130, the pixel electrode 150, and the common electrode 154 are made of laminated film layers of Al and Cr. The active layer 110 of the TFT101 is made of a laminated film of a-Si which is separated into two layers which are 40 nm thick and 180 nm thick. Only the lower layer of the a-Si layer at the peripheral circuit portion is composed of a poly-Si film made by a laser annealing method. That is, the TFT at the circuit portion has two layers of film composed of the poly-a-Si film and the a-Si film as an active layer. The n+a-Si layer 135 is formed between the source and drain electrodes and the active layer. The pixel electrode 150 is formed in parallel to the image signal line 137 in a strip shape. The common line 154 is formed at the vicinity of the image signal line of an adjacent row in parallel to the image signal line. The common line supplies a common voltage in a column direction in the display plane. The liquid crystal is controlled in its alignment by an electric field in parallel to the surface of the substrate between the pixel electrode 150 and the common electrode 154.

In accordance with the lateral electric field in the present embodiment, birefringence of the liquid crystal based on the viewing angle is rare, and so the range of the viewing angle for image display is wide. The liquid crystal capacitance is at most ⅕ in comparison with that of a conventional vertical electric field case. Further, the capacitances of the signal line and the scanning signal line are also reduced to approximately a half of the conventional values. Accordingly, the writing time by the TFT of the pixel can be improved by five times the writing time of a conventional device. Therefore, the TFT of the pixel is chargeable even if the mobility of the TFT is low, and an improvement in the performance of the poly-a-Si in the peripheral circuit can be realized without considering deterioration of the characteristics of the a-Si in the pixel. For instance, in the case of laser annealing, the substrate can be heated to approximately 400° C. In order to improve the characteristics of the poly a-Si film after the laser annealing, the forming condition of the a-Si film, a starting material, can be optimized. For instance, a film having a large amount of Si—$H_2$ bond is used. The Si film made by a spattering method having no hydrogen is laser annealed, and subsequently, hydrogen may be introduced into the Si film by a plasma hydrogenation method. In accordance with the above described methods, the characteristics of the a-Si TFT is lowered, but the mobility of the poly-Si TFT can be improved to at least 30 cm²/Vs. A high precision liquid crystal display apparatus can be realized which as a fast operation. The channel width of the TFT can be reduced because the charging capacity has a sufficient margin. As the area of the peripheral circuit can be decreased, the outer peripheral area of the liquid crystal display apparatus outside of the display region, can be reduced. The aperture ratio of the pixel is increased by miniaturization of the pixel TFT, and consequently, an improvement in the brightness of the liquid crystal display apparatus, and a reduction of the power consumption of the back light can be achieved. The power consumption can be decreased as much as the voltage, which is held by the liquid crystal capacitance during the off-time of the TFT, and the liquid crystal capacity are reduced.

The liquid crystal capacitance of the lateral electric field type is small and apt to be affected. However, in the present embodiment, the pixel TFT is an inverted staggered TFT of a-Si and has a naturally low off-state current. Accordingly, any affect of the voltage drop by the off-state current does not exist.

In accordance with the present embodiment, the power consumption can be reduced because the capacity of the line capacitor and the peripheral circuit for driving the line are small. When the present embodiment is used in a portable information processing apparatus, advantages such as an increased life of the cells, a reduction in the size of the apparatus, and a reduction in the weight of the apparatus can be achieved.

The LCD in accordance with the present invention has further advantages for other portable information processing apparatus. For instance, the LCD of the present invention is effective for apparatus wherein the power to process information by an IC is supplied by cells, such as a portable telephone, portable game machines, and portable information processors used in retail shops for a sales/order controlling system.

Figure 13:
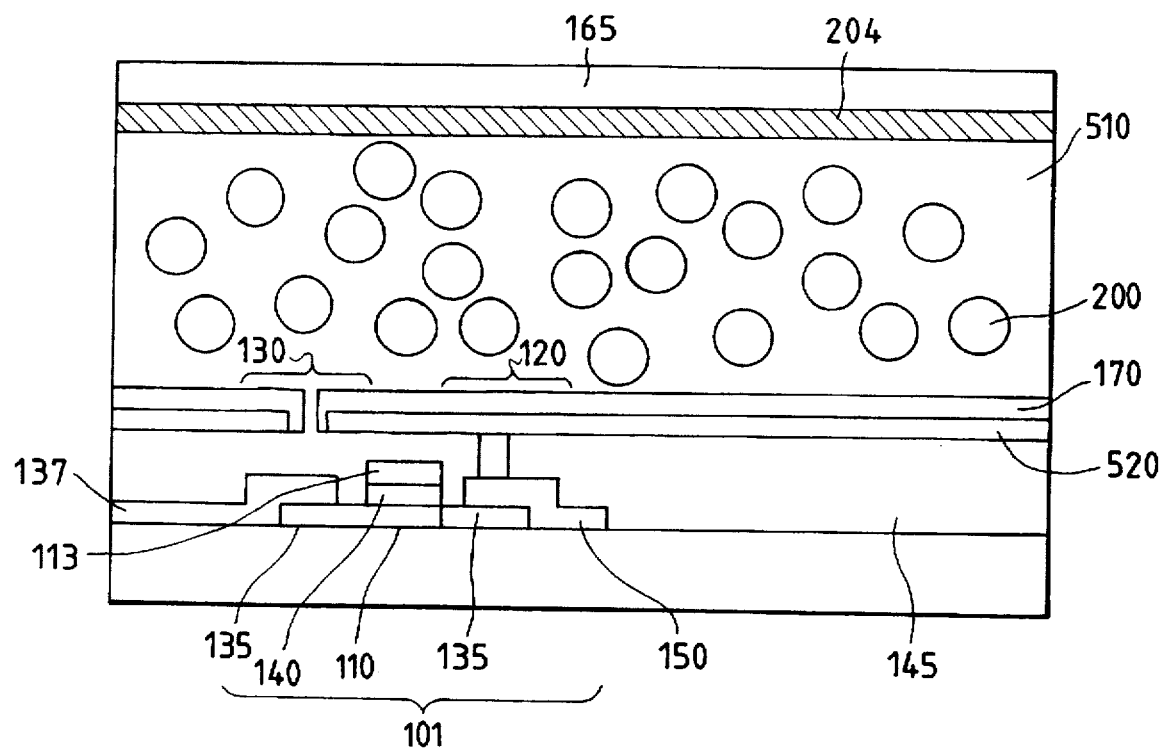
FIG. 13 is a cross sectional view of structure of the liquid crystal cell.

As a third embodiment, a liquid crystal display apparatus of reflective type mode using no counter substrate will be described hereinafter. FIG. 13 is a cross sectional view of a structure of the liquid crystal cell. A coplanar type TFT 101 is formed on a glass substrate 10. A protecting film 145 for the TFT is made of a polyamide resin, which is applied on the TFT by spin application, dried, and has its surface flattened. A reflective pixel electrode 520 is formed on the protecting film 145. As for the liquid crystal, a polymer dispersed liquid crystal (PDLC) is used. The PDLC is a polymer film of which the pores are filled with a liquid crystal material, and is obtained by phase separation of a homogeneous solution of the liquid crystal material and the polymer material by polymerization reaction. The liquid crystal was E-8 made by BDH Co., and a mixed solution of 2-ethylhexyl acrylate, urethane acrylate, and photopolymerization initiator was used for the polymer material. After filling the mixed solution into the liquid crystal cell, the PDLC was obtained by photopolymerization. After applying the mixed solution, the PDLC was obtained by curing the polymer components by photopolymerization reaction. As for a protecting layer, an organic film 204 was applied and formed on surface of the PDLC film. Material for the protecting film was the same as that of the polymer material for the PDLC. The counter electrode 165 of ITO was formed by a sputtering method at low temperature.

The PDLC can also be formed by a immersion process. A porous polymer film is formed by applying a polymer film containing fine particles, and subsequently, eliminating the fine particles. For instance, a polyvinyl alcohol solution containing polymethyl methacrylate particles of 1 μm in diameter is used. The application is performed by a spinner method. After drying, the applied film is immersed into chloroform. The fine particles are dissolved to form open pores, and the PDLC is obtained by impregnating the pores with the liquid crystal. Because of no counter substrate, the liquid crystal cell can be light in weight and thin in depth. Further, in accordance with the present embodiment, it is not necessary to seal the liquid crystal cell at the periphery of the cell. Therefore, the liquid crystal display apparatus can be reduced in width by as much as the width of the sealing.

Figure 10:
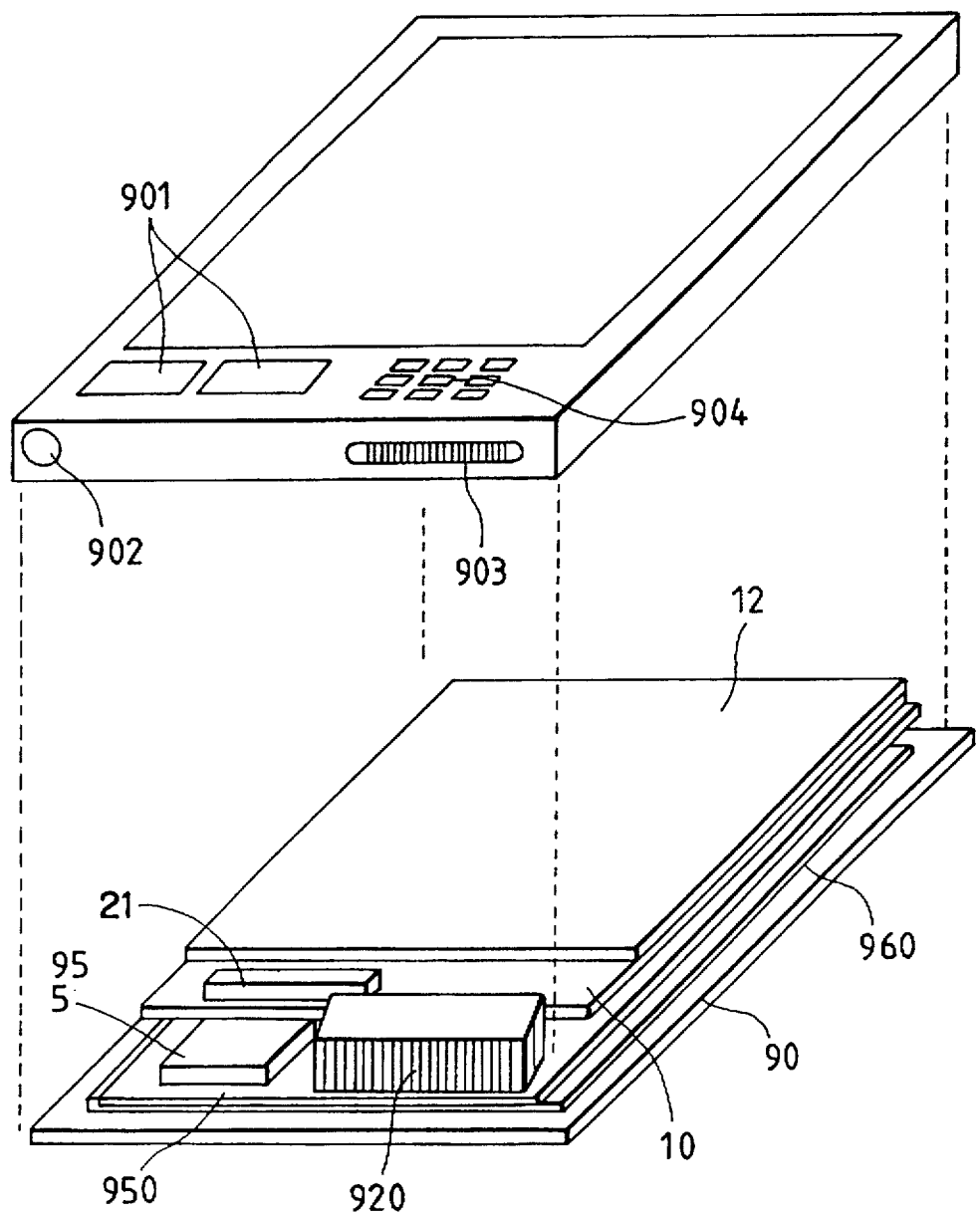
FIG. 10 is a perspective view showing the structure of an information processing apparatus of an embodiment of the present invention.

FIG. 10 is a perspective view of a portable information processing apparatus using the liquid crystal display apparatus relating to the present invention. The information processing apparatus is a note type personal computer having a communicating function and comprises a CPU board 950 mounted with information processing functional members, such as mainly microprocessors, rechargeable batteries 920 for supplying power to the whole system in the computer, a key board 904 for numerical data input, a selective switch 901 for an information processing menu, and memory cards 960 for data storage. The liquid crystal display formed by the substrates 10 and 12 is a transmitting type having a back light at a rear side of the display. Because the aperture ratio of the active matrix substrate had been increased, the utilization factor of the back light was increased, and consequently, the brightness of the LCD was improved. Further, sufficient brightness was obtained by the back light with small electric power, and accordingly, a thinning and weight reduction of the back light and a reduction in the size and weight of the battery, serving as the electric power source of the back light, could be achieved. Accordingly, directly or indirectly, the electronic processor including its container and structure members for support can be reduced in size and weight, and the portability of the note type personal computer can be improved. Further, the usable hours for each charge of the battery can be extended, and the convenience in use of the personal computer can be improved.

The LCD relating to the present invention can be effective for not only the note type personal computer described in the present embodiment, but also for an apparatus for processing information using an integrated circuit driven by power from batteries, such as portable telephones, portable game machines, and portable information processors for managing sales/order in retail shops.

Figure 14:
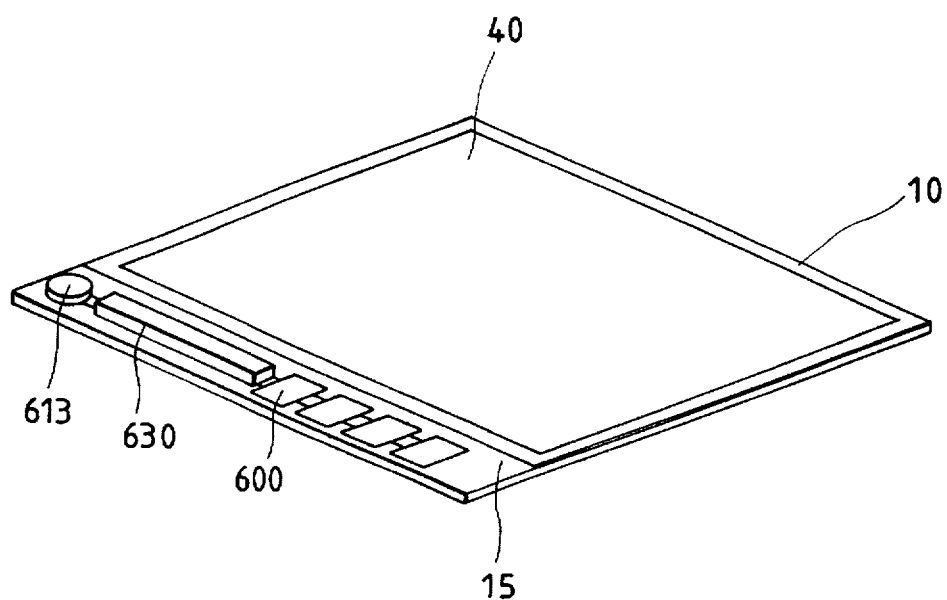
FIG. 14 is a perspective view showing the structure of the information processing apparatus.
Figure 15:
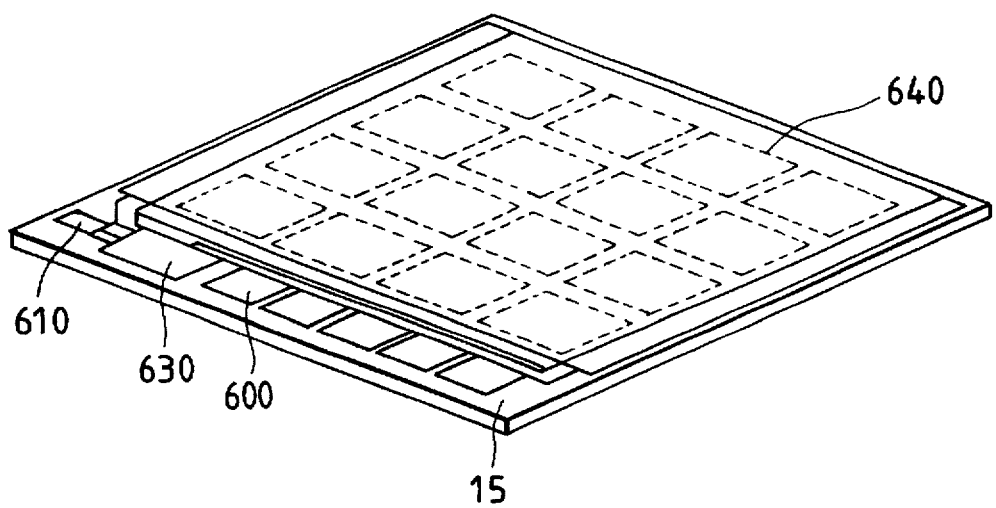
FIG. 15 is a perspective view showing the structure of the information processing apparatus.
Figure 16:
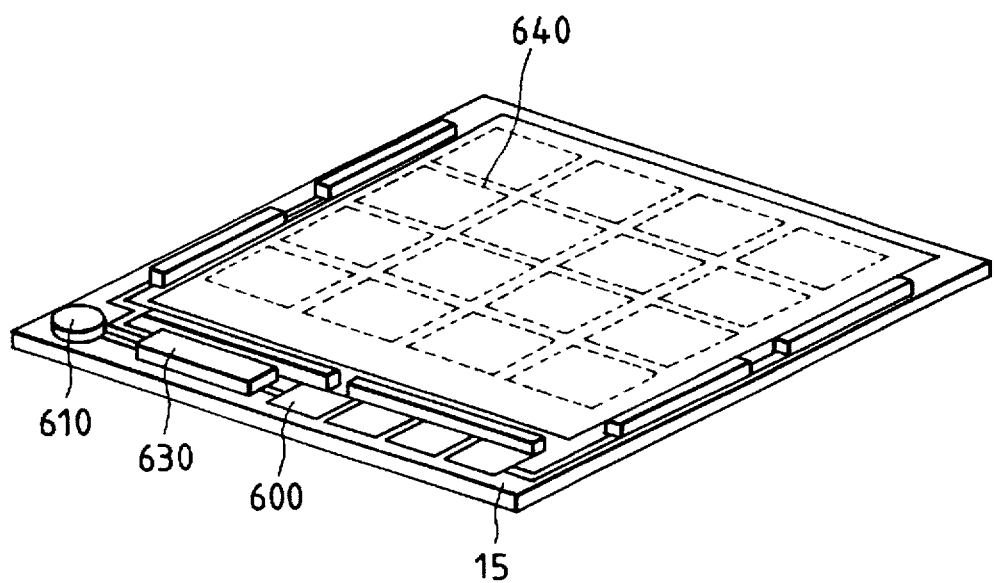
FIG. 16 is a perspective view showing the structure of the information processing apparatus.

FIG. 14 is a perspective view of a card type information processor using the liquid crystal display apparatus relating to the present invention. A display region 10 is formed on an opaque plastic substrate 15. An active layer of TFTs for the pixels is a-Si:HTFT layer made at a substrate temperature of 150° C. by ECR plasma CVD. The peripheral circuits are made of poly-Si TFT obtained by laser annealing the a-Si film. Because the laser annealing is performed by heating in a moment, the plastic substrate is not damaged. The plastic substrate is safe without any concern for breakage due to its plastic material. Further, the specific density of the plastic is approximately half that of glass, and accordingly, a reduction of the apparatus in weight could be achieved. The display mode of the liquid crystal is the reflective type. On account of the opaque nature, no shielding for light from the rear side of the display need be considered. The liquid crystal is a PDLC liquid crystal formed by application. The driver 630 is a string type, which is integrated with CPU function. A solar cell 600 is integrated on the substrate as a power source for the whole apparatus. Transmitting and receiving information to/from externals are performed by input/output sensors 610 (for example LED and photodiode) integrated on the substrate. In accordance with the present embodiment, many members, such as the electric power source, the back light, the substrate mounting the control circuits, FPC., and container, can be omitted, and accordingly, the apparatus can be reduced in weight, in size, and in thickness. The portability of the information processor can be improved remarkably. As a similar embodiment, an example which uses a string driver and mounts a CPU630 on the substrate is shown in FIG. 16. FIG. 15 shows an example wherein all elements are integrated on the substrate. In both cases, the portability of the apparatus can be improved remarkably.

As described above, in accordance with the present invention, the active matrix liquid crystal display apparatus can be reduced in size, and the portability of the liquid crystal display apparatus can be improved.

What is claimed is:

1. A liquid crystal display apparatus, comprising:

a pair of substrates, at least one of which is transparent;

a liquid crystal layer formed by enclosing a liquid crystal composition between said pair of substrates;

a display region having a plurality of first semiconductor elements which are arranged in a matrix on one substrate of said pair of substrates;

peripheral circuits having a plurality of second semiconductor elements for driving said plurality of first semiconductor elements, arranged at a periphery of said display region, said peripheral circuits are formed on said one substrate of said pair of substrates and at least a part of said peripheral circuit are arranged in a peripheral circuits region which is held between said pair of substrates; and at least one driver circuit which is an integrated circuit for driving said peripheral circuits is formed on said one substrate of said pair of substrates in a driver integrated circuit region which is not held between said pair of substrates.

2. A liquid crystal display apparatus as claimed in claim 22, wherein said first and second semiconductor elements are thin film transistors.

3. A liquid crystal display apparatus as claimed in claim 2, wherein said thin film transistors at the display region have a mobility in a range of 1 cm$^2$/Vs to 5 cm$^2$/Vs;

said thin film transistors at the peripheral circuits region have a mobility in a range from 10 cm$^2$/Vs to 30 cm$^2$/Vs; and the amplitude of a liquid crystal driving voltage of the driver circuit is at most 5 V.

4. A liquid crystal display apparatus as claimed in claim 2, wherein said thin film transistors at the display region have a mobility in a range of 0.7 cm$^2$/Vs to 5 cm$^2$/Vs;

said thin film transistors at the peripheral circuits region have a mobility in a range from 30 cm$^2$/Vs to 100 cm$^2$/Vs; and the amplitude of a liquid crystal driving voltage of the driver circuit is at most 5 V.

5. A liquid crystal display apparatus as claimed in claim 2, wherein said thin film transistors at the display region have a mobility in a range of 0.4 cm$^2$/VS to 5 cm$^2$/Vs;

said thin film transistors at the peripheral circuits region have a mobility in a range from 100 cm$^2$/Vs to 300 cm$^2$/Vs;

the amplitude of a liquid crystal driving voltage of the driver circuit is at most 5 V; and a softening point of said one substrate of said pair of substrates is at most 600° C.

6. A liquid crystal display apparatus as claimed in claim 2, wherein the thin film transistors at said display region have a switching time in a range from 30 μs to 60 μs;

the thin film transistors at said peripheral circuit region have a switching time in a range of 3 μs to 12 μs; and said driver circuit has a transistor having a switching time in a range from 0.01 μs to 0.03 μs.

7. A liquid crystal display apparatus as claimed in either of claim 1 or claim 2, wherein said driver is bonded directly to said one substrate of said pair of substrates.

8. A liquid crystal display apparatus as claimed in claim 1, wherein said pair of substrates are made of glass.

9. A liquid crystal display apparatus as claimed in claim 8, wherein said driver is bonded to said one substrate of said pair of substrates by a COG (chip on glass) method.

10. A liquid crystal display apparatus as claimed in claim 1, wherein the number of driver circuits bonded to said one substrate of said pair of substrates is one.

11. A liquid crystal display apparatus as claimed in claim 1, wherein said peripheral circuits region comprises:

a signal circuit at an image signal side of said display region for supplying an image signal to said plural first semiconductor elements arranged in said display region; and a signal circuit at a scan signal side of said display region for supplying a scan signal to said plural first semiconductor elements.

12. A liquid crystal display apparatus as claimed in claim 11, wherein the number of driver circuits bonded to said other substrate of said pair of substrates is two, and respective ones of said driver circuits are arranged adjacent to said signal circuit at said image signal side and at said scan signal side of said display region, respectively.

13. A liquid crystal display apparatus as claimed in claim 1, wherein the diagonal length of said display region is in a range from 75 mm to 175 mm; and the distance from the outer periphery of the display region to the outer periphery of the liquid crystal display apparatus is at most 5 mm.

14. A liquid crystal display apparatus as claimed in claim 1, wherein the ratio of the area of said display region to the area of said one substrate of said pair of substrates is in a range from 70% to 95%.

15. A liquid crystal display apparatus as claimed in claim 1, wherein the distance between said driver circuit and said peripheral circuit region is at most 1 mm.

16. A liquid crystal display apparatus as claimed in claim 1, wherein a light-shield film is formed on said peripheral circuit region.

17. A liquid crystal display apparatus as claimed in claim 1, wherein a driver circuit is provided at only a short side of said one substrate of said pair of substrates.

18. A liquid crystal display apparatus as claimed in claim 1, wherein a driver circuit is provided at only a long side of said one substrate of said pair of substrates.

19. A liquid crystal display apparatus as claimed in claim 1, wherein a threshold voltage of said liquid crystal layer is at most 2 V.

20. A liquid crystal display apparatus as claimed in claim 1, wherein the active region of said first and second semiconductor elements are made of amorphous silicon and polycrystalline silicon; and the active region of said semiconductor elements comprising said driver circuit is made of single crystalline silicon.

21. A liquid crystal display apparatus according to claim 1, wherein another part of said peripheral circuits is arranged in said driver integrated circuit region which is not held between said pair of substrates.

22. A liquid crystal display apparatus comprising:

a pair of substrates, at least one of which is transparent;

a liquid crystal layer formed by enclosing a liquid crystal composition between said pair of substrates;

a display region, having a plurality of first semiconductor elements which are arranged in a matrix is formed on one substrate;

a peripheral circuits region having a plurality of second semiconductor elements for driving said plurality of first semiconductor elements, arranged at a periphery of said display region, are formed on said one substrate of said pair of substrates;

at least one driver circuit for driving said peripheral circuits bonded at a designated region on said one substrate of said pair of substrates;

wherein said first and second semiconductor elements are thin film transistors; and the thin film transistors at said display region have a switching time in a range from 30 µs to 60 µs;

the thin film transistors at said peripheral circuit region have a switching time in a range of 3 µs to 12 µs; and said driver circuit has a transistor having a switching time in a range from 0.01 µs to 0.03 µs.

* * * * *